(12) United States Patent
Schaedler et al.

(10) Patent No.: US 10,753,418 B2
(45) Date of Patent: Aug. 25, 2020

(54) ENERGY ABSORBING TRUSS STRUCTURES FOR MITIGATION OF INJURIES FROM BLASTS AND IMPACTS

(71) Applicant: HRL LABORATORIES, LLC, Malibu, CA (US)

(72) Inventors: Tobias A. Schaedler, Oak Park, CA (US); Alan J. Jacobsen, Woodland Hills, CA (US); Zak C. Eckel, Calabasas, CA (US); Sophia S. Yang, Los Angeles, CA (US); Adam E. Sorensen, Glendale, CA (US); Jacob M. Hundley, Los Angeles, CA (US); William Carter, Calabasas, CA (US); Jie Jiang, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/795,811

(22) Filed: Oct. 27, 2017

(65) Prior Publication Data
US 2018/0058531 A1    Mar. 1, 2018

Related U.S. Application Data

(62) Division of application No. 14/198,323, filed on Mar. 5, 2014, now Pat. No. 9,890,827.
(Continued)

(51) Int. Cl.
*B23B 3/12*    (2006.01)
*F16F 7/12*    (2006.01)
(Continued)

(52) U.S. Cl.
CPC .............. *F16F 7/121* (2013.01); *B32B 3/12* (2013.01); *B32B 5/18* (2013.01); *B32B 9/005* (2013.01);
(Continued)

(58) Field of Classification Search
CPC . B32B 3/12; B32B 3/266; A61F 2002/30156; F16F 7/121; F16F 7/122;
(Continued)

(56) References Cited

U.S. PATENT DOCUMENTS 4,049,855 A * 9/1977 Cogan ................... B32B 3/12
428/116
7,424,967 B2 * 9/2008 Ervin ................... A47J 36/02
228/193
(Continued)

FOREIGN PATENT DOCUMENTS

CN    102148391 A    8/2011
CN    102427936 A    4/2012
(Continued)

OTHER PUBLICATIONS

DuPont Kapton PST Polyimide Film Industry Specifications Bulletin PST-00-1. 4 Pages. (Year: 2005).*
(Continued)

*Primary Examiner* — Bradley T King
*Assistant Examiner* — Stephen M Bowes
(74) *Attorney, Agent, or Firm* — Lewis Roca Rothgerber Christie, LLP

(57) ABSTRACT

Architected materials with superior energy absorption properties when loaded in compression. In several embodiments such materials are formed from micro-truss structures composed of interpenetrating tubes in a volume between a first surface and a second surface. The stress-strain response of these structures, for compressive loads applied to the two surfaces, is tailored by arranging for some but not all of the tubes to extend to both surfaces, adjusting the number of layers of repeated unit cells in the structure, arranging for the
(Continued)

nodes to be offset from alignment along lines normal to the surfaces, or including multiple interlocking micro-truss structures.

9 Claims, 25 Drawing Sheets

Related U.S. Application Data

(60) Provisional application No. 61/775,090, filed on Mar. 8, 2013.

(51) Int. Cl.
| | | |
|---|---|---|
| *B32B 9/00* | (2006.01) | |
| *B32B 27/34* | (2006.01) | |
| *B32B 3/12* | (2006.01) | |
| *B32B 15/04* | (2006.01) | |
| *B32B 27/32* | (2006.01) | |
| *B32B 15/20* | (2006.01) | |
| *B32B 9/04* | (2006.01) | |
| *B32B 15/18* | (2006.01) | |
| *B32B 27/36* | (2006.01) | |
| *B32B 27/30* | (2006.01) | |
| *B32B 5/18* | (2006.01) | |
| *F41H 5/02* | (2006.01) | |
| *B60N 3/04* | (2006.01) | |
| *F41H 5/007* | (2006.01) | |
| *F41H 7/04* | (2006.01) | |

(52) U.S. Cl.
CPC .............. *B32B 9/04* (2013.01); *B32B 15/04* (2013.01); *B32B 15/18* (2013.01); *B32B 15/20* (2013.01); *B32B 27/302* (2013.01); *B32B 27/32* (2013.01); *B32B 27/34* (2013.01); *B32B 27/365* (2013.01); *B60N 3/048* (2013.01); *F41H 5/007* (2013.01); *F41H 5/02* (2013.01); *B32B 2307/558* (2013.01); *B32B 2307/718* (2013.01); *B32B 2571/00* (2013.01); *B32B 2571/02* (2013.01); *B32B 2605/00* (2013.01); *F41H 7/042* (2013.01)

(58) Field of Classification Search
CPC .... F16F 7/12; F16F 7/003; E04B 1/19; E04B 1/1903; E04B 1/1909; Y10T 428/24273

USPC ....................................... 428/131, 116, 304.4
See application file for complete search history.

(56) References Cited

U.S. PATENT DOCUMENTS

| | | | |
|---|---|---|---|
| 7,653,276 B1 * | 1/2010 | Gross | F28D 20/023 |
| | | | 385/46 |
| 7,687,132 B1 | 3/2010 | Gross et al. | |
| 8,353,240 B1 | 1/2013 | Schaedler et al. | |
| 9,453,604 B1 | 9/2016 | Maloney et al. | |
| 2005/0202206 A1 | 9/2005 | Wadley et al. | |
| 2006/0163319 A1 | 7/2006 | Ervin et al. | |
| 2008/0226870 A1 | 9/2008 | Sypeck et al. | |
| 2009/0282773 A1 | 11/2009 | Queheillalt et al. | |
| 2010/0233421 A1 * | 9/2010 | Lind | E04B 1/3211 |
| | | | 428/108 |
| 2010/0300669 A1 | 12/2010 | Jacobsen et al. | |
| 2011/0111954 A1 | 5/2011 | Li et al. | |
| 2011/0229685 A1 | 9/2011 | Lin et al. | |
| 2011/0250384 A1 * | 10/2011 | Sumi | B60R 5/044 |
| | | | 428/118 |
| 2013/0123935 A1 | 5/2013 | Hunt et al. | |
| 2014/0251585 A1 | 9/2014 | Kusuda et al. | |

FOREIGN PATENT DOCUMENTS

| | | |
|---|---|---|
| WO | WO 2004/022869 A3 | 3/2004 |
| WO | WO 2008/127301 A9 | 10/2008 |

OTHER PUBLICATIONS

SIPO Office Action dated Apr. 21, 2016, for corresponding CN Application No. 201480013119.0 and English Translation (10 pages).
Extended European Search Report dated Nov. 28, 2016 for corresponding EP Application No. 14760566.1 (9 pages).
CN Office Action dated Nov. 21, 2016 for corresponding Application No. CN 201480013119.0 and English Translation (4 pages).
Schaedler et al., "Designing Metallic Microlattices for Energy Absorber Applications," Advanced Engineering Materials, pp. 1-8, 2013.
International Preliminary Report on Patentability for PCT Application No. PCT/US14/19980; dated Mar. 26, 205, 4 pages.
International Search Report and Written Opinion for International Application No. PCT/US2014/019980; dated Jun. 16, 2014, 14 pages.

* cited by examiner

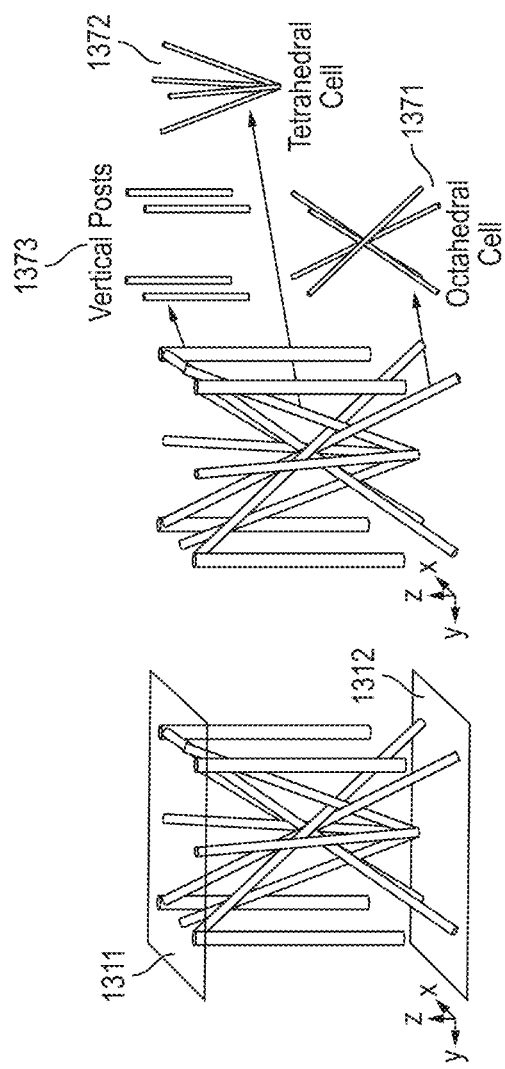
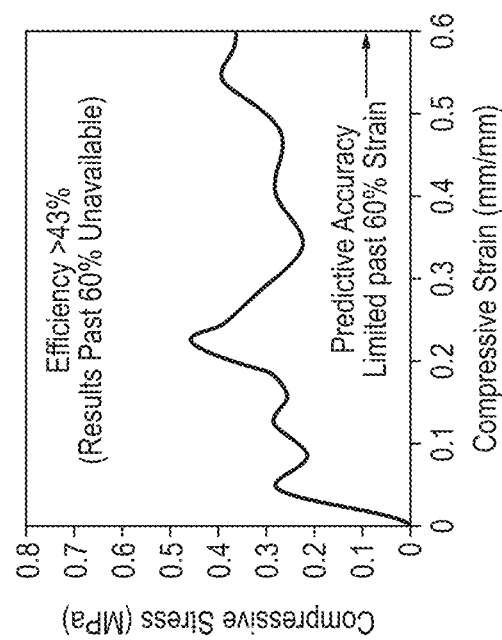
FIG. 13a
FIG. 13b

ENERGY ABSORBING TRUSS STRUCTURES FOR MITIGATION OF INJURIES FROM BLASTS AND IMPACTS

CROSS-REFERENCE TO RELATED APPLICATION(S)

The present application is a divisional of U.S. application Ser. No. 14/198,323, filed on Mar. 5, 2014, which claims priority to and the benefit of Provisional Application No. 61/775,090, filed Mar. 8, 2013, entitled "ENERGY ABSORBING TRUSS STRUCTURES FOR MITIGATION OF INJURIES FROM BLASTS AND IMPACTS", the entire contents of both of which are incorporated herein by reference.

CROSS-REFERENCE TO RELATED APPLICATION(S)

The use of metallic lattice (truss) materials for energy absorbing applications is discussed in U.S. Pat. No. 7,382,959 ("Optically oriented three-dimensional polymer microstructures"), U.S. Pat. No. 8,353,240 ("Compressible fluid filled micro-truss for energy absorption"), and U.S. Pat. No. 8,197,930, issued on Jun. 12, 2012; U.S. Pat. No. 8,320,727, issued on Nov. 27, 2012; U.S. Pat. No. 7,687,132, issued on Mar. 30, 2010; U.S. Pat. No. 7,653,276, issued on Jan. 26, 2010; and U.S. Pat. No. 9,116,428, issued on Aug. 25, 2015, which are incorporated by reference herein in their entirety. Various micro-truss structures and methods of manufacturing micro-truss structures are described, for example, in U.S. Pat. No. 9,116,428, which discloses a method of fabricating micro-truss structures having a fixed area, U.S. Pat. No. 8,367,306, which discloses a method of continuously fabricating micro-truss structures according to a continuous process (e.g., a strip of arbitrary length), and U.S. Pat. No. 8,353,240, which discloses a compressible fluid filled micro-truss for energy absorption. Each of the above cross-referenced applications is incorporated by reference herein in its entirety.

STATEMENT REGARDING FEDERALLY SPONSORED RESEARCH OR DEVELOPMENT

This invention was made with U.S. Government support under Contract No. W91CRB-11-C-0112 awarded by the Defense Advanced Research Projects Agency (DARPA) Defense Sciences Office. The U.S. Government has certain rights to this invention.

FIELD OF THE INVENTION

The following description relates to energy-absorption materials and more particularly to cellular materials with periodic, ordered micro-micro-truss structures with enhanced energy absorption capabilities for mitigation of injuries from blasts and impacts.

BACKGROUND

Energy absorption materials are widely used to protect people and goods from damaging impacts and forces. In an impact or blast event these materials should reduce the impulsive load to a level below a damage threshold by absorbing a maximum of energy while not transmitting a stress in excess of the damage threshold. Examples from the automotive, sporting and defense sectors include crash absorbers, helmet pads and blast-mitigating foot pads. Depending on the application, different performance characteristics are required of the energy absorbing material. The injury criterion or damage threshold $\sigma_{th}$ determines the maximum allowable stress, $\sigma_{tr}$, transmitted through the energy absorber, i.e., to avoid damage is it necessary that $\sigma_{tr} < \sigma_{th}$. For energy absorbers in direct contact with the human body the injury criterion is generally on the order of 1 MPa.

Cellular materials are often used as energy absorption materials because they can absorb energy on compression. Single use energy absorption materials may be metallic and include closed or open cell foams and pre-crushed honeycombs; multi-use materials with reversible energy absorption are typically polymeric and include visco-elastic closed or open cell foams, and thermoplastic polyurethane (TPU) twin hemispheres. Lattice structures can be composed of polymer or metallic materials and may consist of a periodic arrangement of solid or hollow members (struts, trusses).

FIG. 1 is a schematic plot illustrating the ideal behavior of an energy absorption material. At low stress, the strain increases linearly with stress, up to a stress of, e.g., 1 MPa. At this threshold stress, the strain of the material increases rapidly at substantially constant stress, and the material absorbs energy. Finally, when the material reaches a high strain referred to as the densification strain, the stress again increases. The maximum possible volumetric energy absorption for a given material structure is calculated as the product of the peak stress with 100% strain.

Real materials typically deviate from the ideal response and have lower absorption efficiency. FIG. 2 illustrates the typical behavior of a lattice or truss structure with high structural symmetry and internal connectivity. Here, after reaching a peak initial stress (labeled as Max. transmitted stress in FIG. 2), the strain increases at a lower level of stress, resulting in a reduction in energy absorption compared to the ideal case illustrated in FIG. 1. This is believed to be due to the fact that the onset of buckling at a single point in such a structure with high structural symmetry and internal connectivity triggers buckling throughout the structure, which leads to an abrupt loss of load-carrying capability and reduced impact energy absorption efficiency. In such a case, the densification strain is defined as the strain at which the stress-strain curve intersects a horizontal line at the peak initial stress value. The volumetric energy absorbed is calculated as the area under the stress-strain curve between 0% strain and the densification strain. The energy absorption efficiency of such a material is calculated as the ratio of the volumetric energy absorbed to the maximum possible volumetric energy absorption.

FIG. 3 shows a compressive stress-strain response typical of types of aluminum foam used as energy absorption materials. Such materials have a plateau-like stress-strain curve and do not exhibit the non-ideal behavior of an initial stress peak followed by softening. However, such materials have a low densification strain since the stress starts to rise at an increasing rate at approximately 30% strain, which limits the energy absorption efficiency to be about 35%. FIG. 4 shows the compressive stress-strain response of an aluminum honeycomb energy absorption material. In this case, the material exhibits a large initial stress peak followed by softening, which limits its energy absorption efficiency to about 34%. FIG. 5 shows the compressive stress-strain response of a twin hemisphere energy absorption material. The material exhibits softening after an initial stress peak, which limits its energy absorption efficiency to about 47%.

Certain materials with a truss or lattice architecture have constant architectural parameters through the thickness direction, i.e., the energy absorbing direction of the truss or lattice structure. In these materials, the high structural symmetry and lack of disconnected internal members lead to simultaneous buckling and a sharp loss of load transfer capability as shown in FIG. 2. This reduces the energy absorption efficiency of the material as the stress level associated with compaction drops well below the peak value. FIG. 6 displays the compressive stress-strain response of a typical hollow metallic micro-truss structure with no enhancement on the structure. It exhibits a large stress peak followed by softening, and additional stress peaks. The energy absorption efficiency is about 15%-30%.

Therefore, there is a need for micro-truss or lattice architectures with the inherent structural and low mass benefits of such architectures, yet with improved energy absorption response.

SUMMARY

Aspects of embodiments of the present invention pertain to architected materials with superior energy absorption properties when loaded in compression. In several embodiments such materials are formed from micro-truss structures composed of interpenetrating tubes in a volume between a first surface and a second surface. The stress-strain response of these structures, for compressive loads applied to the two surfaces, is tailored by arranging for some but not all of the tubes to extend to both surfaces, adjusting the number of layers of repeated unit cells in the structure, arranging for the nodes to be offset from alignment along lines normal to the surfaces, or including multiple interlocking micro-truss structures.

According to an embodiment of the present invention there is provided a system for protection from impulsive loads as generated by impacts and explosions, the system including: a first micro-truss architecture, wherein the micro-truss architecture is configured to have greater than 50% volume decrease while transmitting nearly constant pressure in the range of 0.3-7 MPa under dynamic loading at 1-20 m/s impact velocity.

In one embodiment, the first micro-truss architecture includes: a first surface and a second surface parallel to each other with a distance therebetween defining a thickness of the micro-truss architecture; a plurality of angled struts extending along a plurality of non-vertical directions each having a first end on the first surface and a second end; a plurality of nodes where the plurality of angled struts extending along a plurality of directions interpenetrate one another; the plurality of angled struts and the plurality of nodes defining a plurality of unit cells each having an upper node among the plurality of nodes, a lower node among the plurality of nodes, and a cell height, the cell height being the distance between the upper node and the lower node, wherein the second end of each angled struts is on the lower node closest to the second surface at a distance away from the second surface; and a vertical post extending from the first surface in a normal direction having a first end on the first surface and a second end extending past the lower node closest to the second surface onto the second surface.

In one embodiment, there is only one layer of unit cells between the first surface and the second surface.

In one embodiment, there are at least two layers of unit cells between the first surface and the second surface.

In one embodiment, the first micro-truss architecture includes: a first surface and a second surface parallel to each other with a distance therebetween defining a thickness of the micro-truss architecture; a plurality of angled struts extending along a plurality of non-vertical directions each having a first end on the first surface and a second end; a plurality of nodes where the plurality of angled struts extending along a plurality of directions interpenetrate one another; the plurality of angled struts and the plurality of nodes defining a plurality of unit cells each having an upper node among the plurality of nodes, a lower node among the plurality of nodes, and a cell height, the cell height being the distance between the upper node and the lower node, wherein the second end of each of the plurality of angled struts extends past the lower node closest to the second surface onto the second surface; and a vertical post extending from the first surface in a normal direction having a first end on the first surface and a second end on the lower node closest to the second surface at a distance away from the second surface.

In one embodiment, the first micro-truss architecture includes: a first surface and a second surface parallel to each other with a distance therebetween defining a thickness of the micro-truss architecture; a plurality of angled struts extending along a plurality of non-vertical directions each having a first end on the first surface and a second end; a plurality of nodes where the plurality of angled struts extending along a plurality of directions interpenetrate one another; the plurality of angled struts and the plurality of nodes defining a plurality of unit cells each having an upper node among the plurality of nodes, a lower node among the plurality of nodes, and a cell height, the cell height being the distance between the upper node and the lower node, wherein there are at least four unit cells stacked over one another in the thickness direction of the micro-truss architecture.

In one embodiment, the system includes: a repeating periodic unit cell structure having a first surface and a second surface parallel to the first surface and defining a height of the repeating periodic unit cell, the periodic unit cell structure including: a first unit cell structure having a first unit cell height; a second unit cell structure having a second unit cell height; a plurality of vertical posts having a third height, wherein the first unit cell structure, the second unit cell structure and the plurality of vertical posts are interlocked within the first unit cell structure, and the first unit cell height is the same as the height of the repeating periodic unit cell and being greater than the second unit cell height and the third height.

In one embodiment, the system includes: a repeating periodic unit cell structure having a first surface and a second surface parallel to the first surface and defining a height of the repeating periodic unit cell, including: two of a first unit cell structure stacked over each other, each having a first unit cell height about half of the height of the repeating periodic unit cell; a second unit cell structure having a second unit cell height about half of the height of the repeating periodic unit cell; a vertical post having a third height lower than the height of the repeating periodic unit cell, wherein the first unit cell structure and the second unit cell structure are both connected to the vertical post.

In one embodiment, the first micro-truss architecture includes: a repeating unit cell structure having a plurality of struts and nodes connecting the plurality of struts; wherein the nodes form a plurality of layers throughout the micro-truss architecture, and at least one layer of nodes wherein each node is configured either at a respective nominal position determined by the repeating unit cell structure, or at a respective shifted position shifted away from the nominal position.

In one embodiment, the shifted position of a node is shifted away from the nominal position of the node by 0.01-0.5 times the length of each strut in between two adjacent nodes.

In one embodiment, the shifted position of a node is shifted away from the nominal position in a direction opposite to the direction of shifts at its nearest neighboring nodes.

In one embodiment, the repeating unit cell structure has three-fold symmetry and each node sits in a position corresponding to the center of nodes in the layers above and below.

In one embodiment, the first micro-truss architecture includes a first surface and a second surface, and the system includes a face sheet on the first surface.

In one embodiment, the face sheet includes a sheet material selected from the group consisting of polymer foam, rubber-like polymer, metal, and combinations thereof.

In one embodiment, the face sheet is configured to protect the micro-truss from deformation during operation, aid in shock absorption, and wrap around a protected object in the event of a blast.

In one embodiment, the system includes: at least another micro-truss architecture with the same architectural parameters stacking over the first micro-truss architecture.

In one embodiment, the system is a part of a foot pad or floor mat inside a vehicle.

In one embodiment, the system is configured to have a maximum transmitted stress of 0.5-1.5 MPa.

In one embodiment, the system is a part of a vehicle underbody or side panel; the system further includes an armor plate; and the system is configured to have a maximum transmitted stress of 1-7 MPa.

In one embodiment, the system is included in padding of a helmet or in a trauma attenuating backing in body armor, and the system is configured to have a maximum transmitted stress of 0.3-1.5 MPa.

In one embodiment, the system includes a fluid, wherein the micro-truss architecture has pores and hollow tubes, and the micro-truss architecture is configured to flow fluid through the pores and the hollow tubes to transport heat for vehicle, helmet or body armor applications.

In one embodiment, the system is a part of a load bearing structural element.

In one embodiment, the micro-truss architecture is made of metal materials.

In one embodiment, the metal is selected from the group consisting of magnesium, aluminum, titanium, chromium, iron, cobalt, nickel, copper, zinc, and combinations and alloys thereof.

In one embodiment, the micro-truss architecture includes polymer materials.

In one embodiment, the polymer is selected from the group consisting of polycarbonate, aramid, high impact polystyrene, nylon, ultra-high molecular weight polyethylene, poly(p-xylylene), and combinations thereof.

BRIEF DESCRIPTION OF THE DRAWINGS

FIG. 13a shows an assembled view and an exploded view of a micro-truss architecture with repeating periodic interlocking unit cell structures according to an embodiment of the present invention.

FIG. 13b shows the simulated stress-strain response, for dynamic compression at 1 m/s, of the embodiment of FIG. 13a.

FIG. 14b shows the simulated stress-strain response, for dynamic compression at 1 m/s, of the embodiment of FIG. 13a.

DETAILED DESCRIPTION

Figure 1:
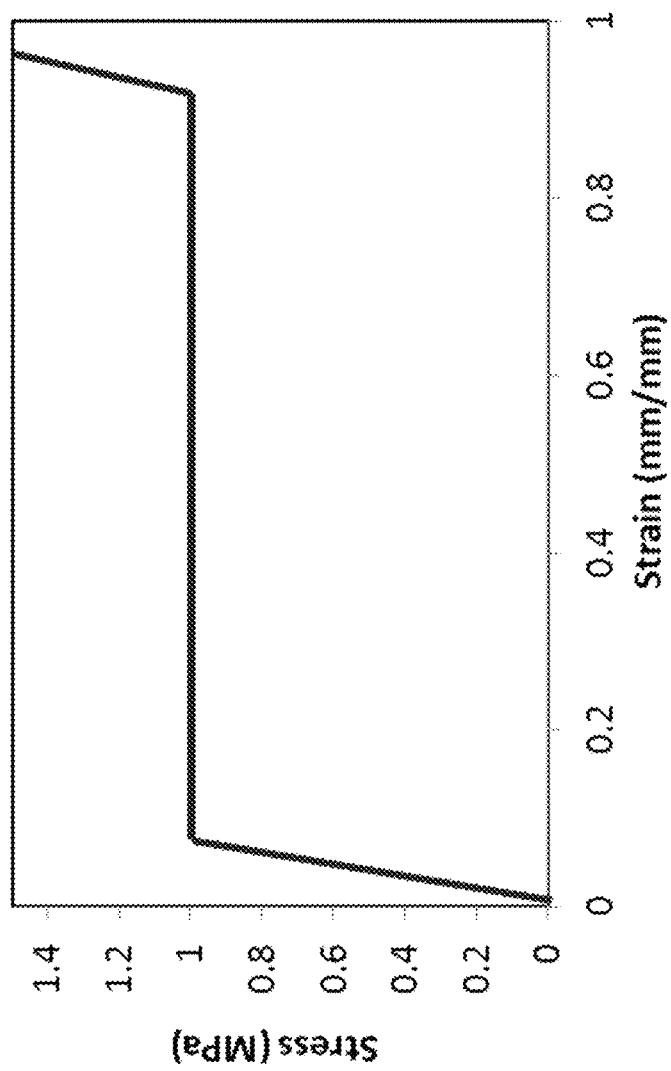
FIG. 1 is a schematic illustration of the compressive stress-strain behavior of an ideal energy absorption material.
Figure 2:
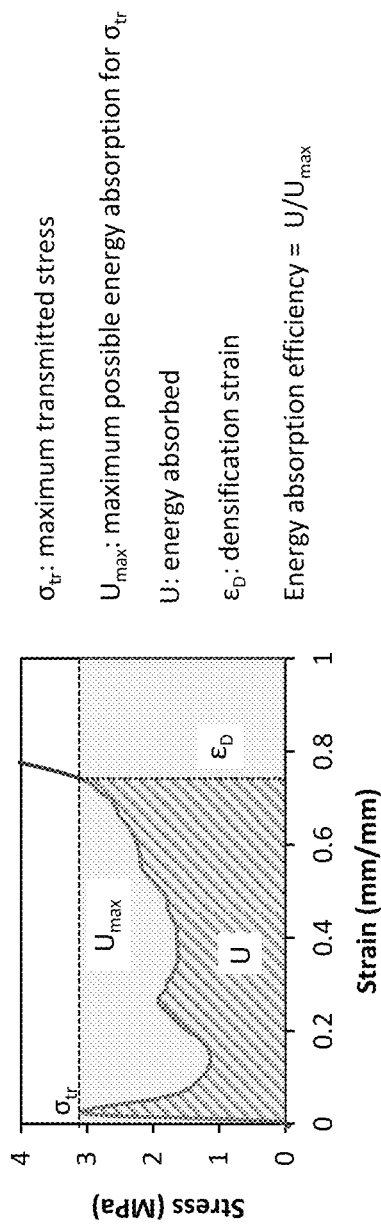
FIG. 2 is a schematic illustration of the compressive stress-strain behavior of a lattice or truss structure with high structural symmetry and internal connectivity and defines the terms used.
Figure 3:
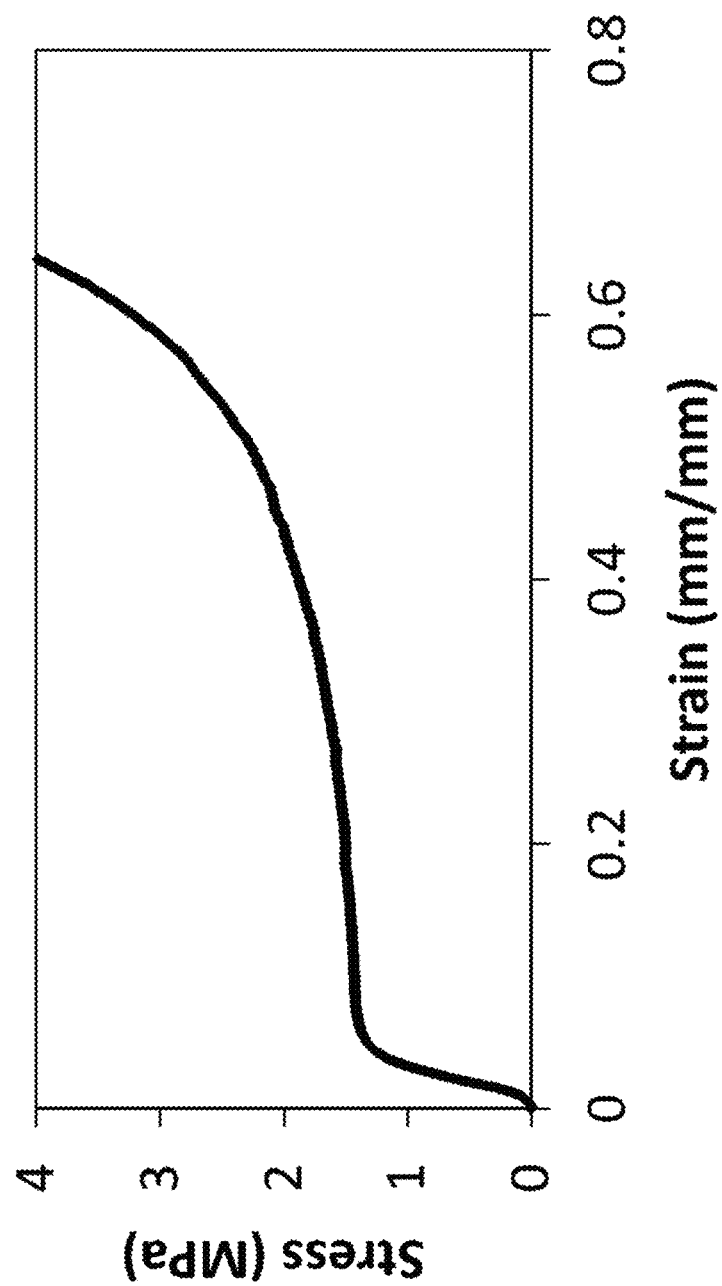
FIG. 3 shows the quasi-static stress-strain performance of a commercial aluminum foam used as energy absorption material.
Figure 4:
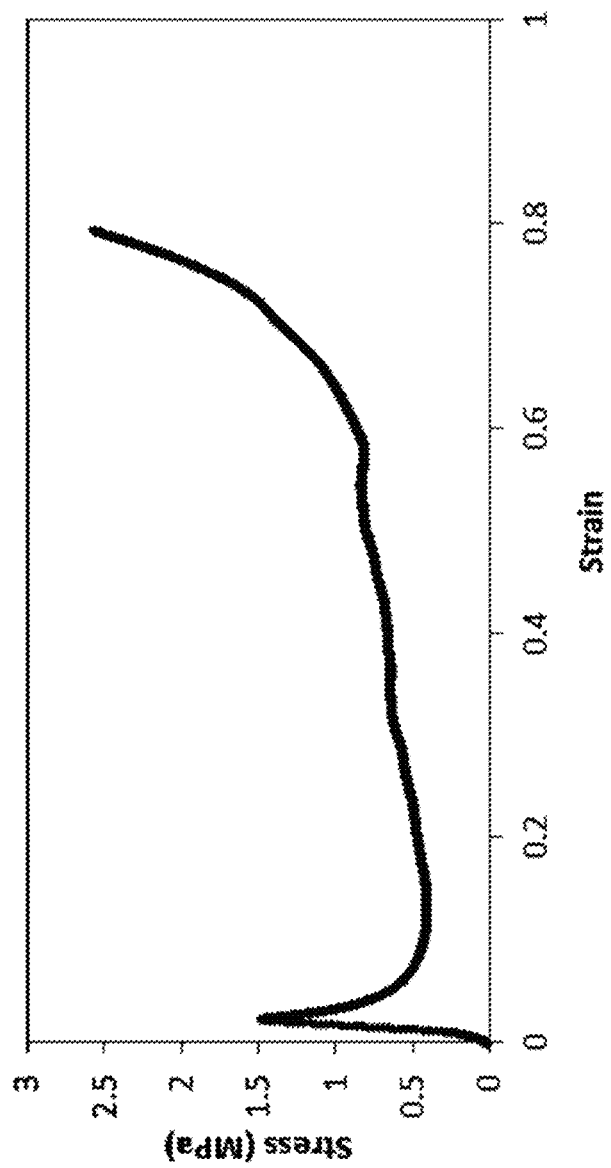
FIG. 4 shows the compressive stress-strain performance of a commercial honeycomb material used as energy absorption material.
Figure 5:
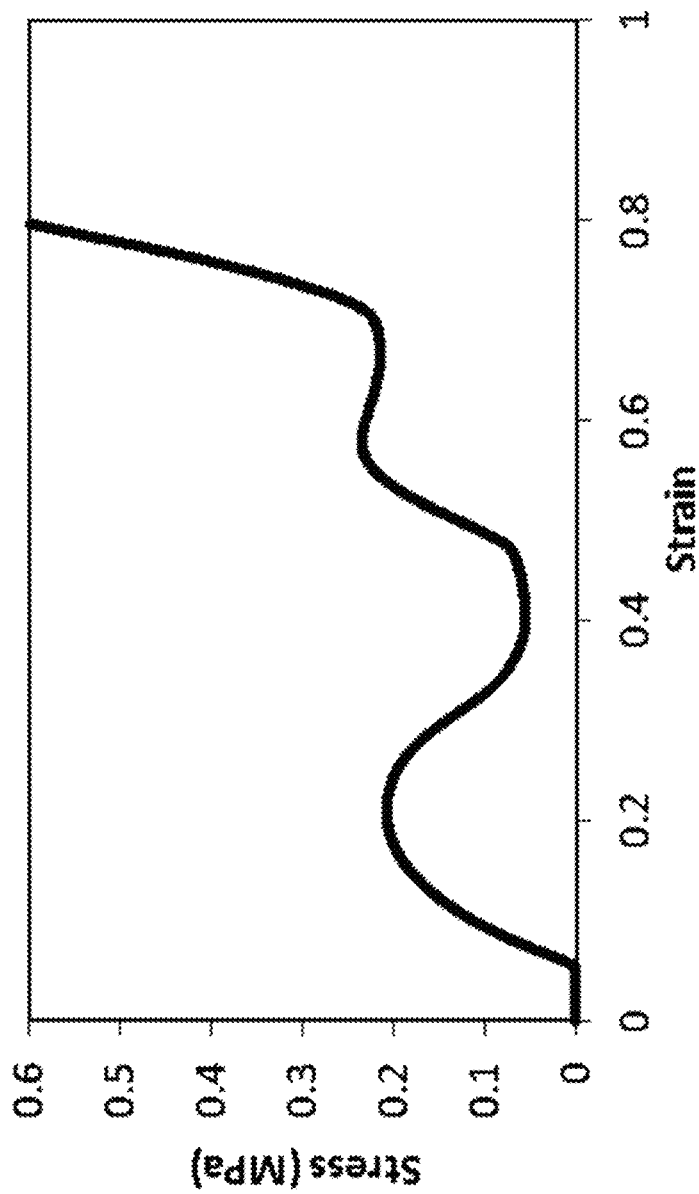
FIG. 5 shows the compressive stress-strain performance of a commercial polyurethane twin hemisphere material blast protection mat.
Figure 6:
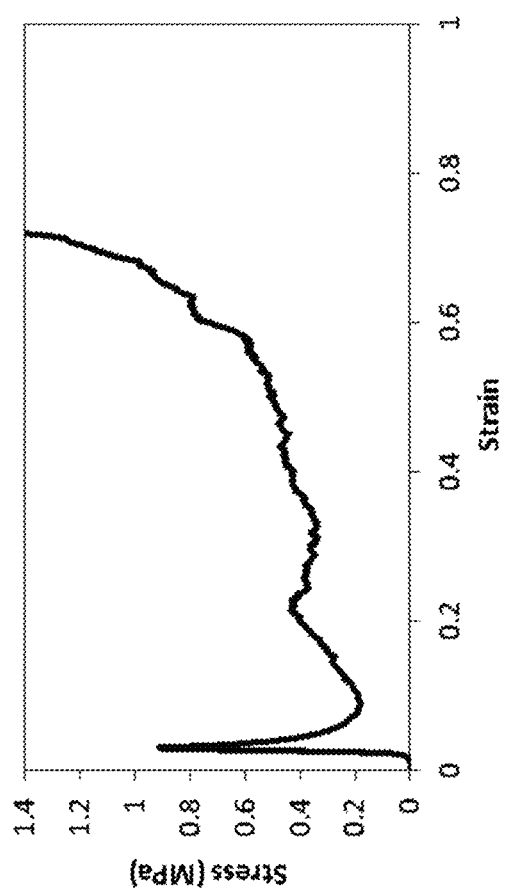
FIG. 6 shows the compressive stress-strain performance of a hollow metallic micro-truss material without enhanced structure.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the other element or be indirectly on the other element with one or more intervening elements interposed therebetween. Like reference numerals designate like elements throughout the specification.

Throughout the disclosure, the terms "member(s)", "strut(s)", and "waveguide(s)" have been used interchangeably. The terms "lattice" and "truss" have been used interchangeably. The term "surface" can be a continuous material surface, or a plane with un-connected points. The term "micro-truss" refers to trusses with node-to-node size from 0.5 mm to 5 cm.

First Embodiment of the Invention

Figure 18:
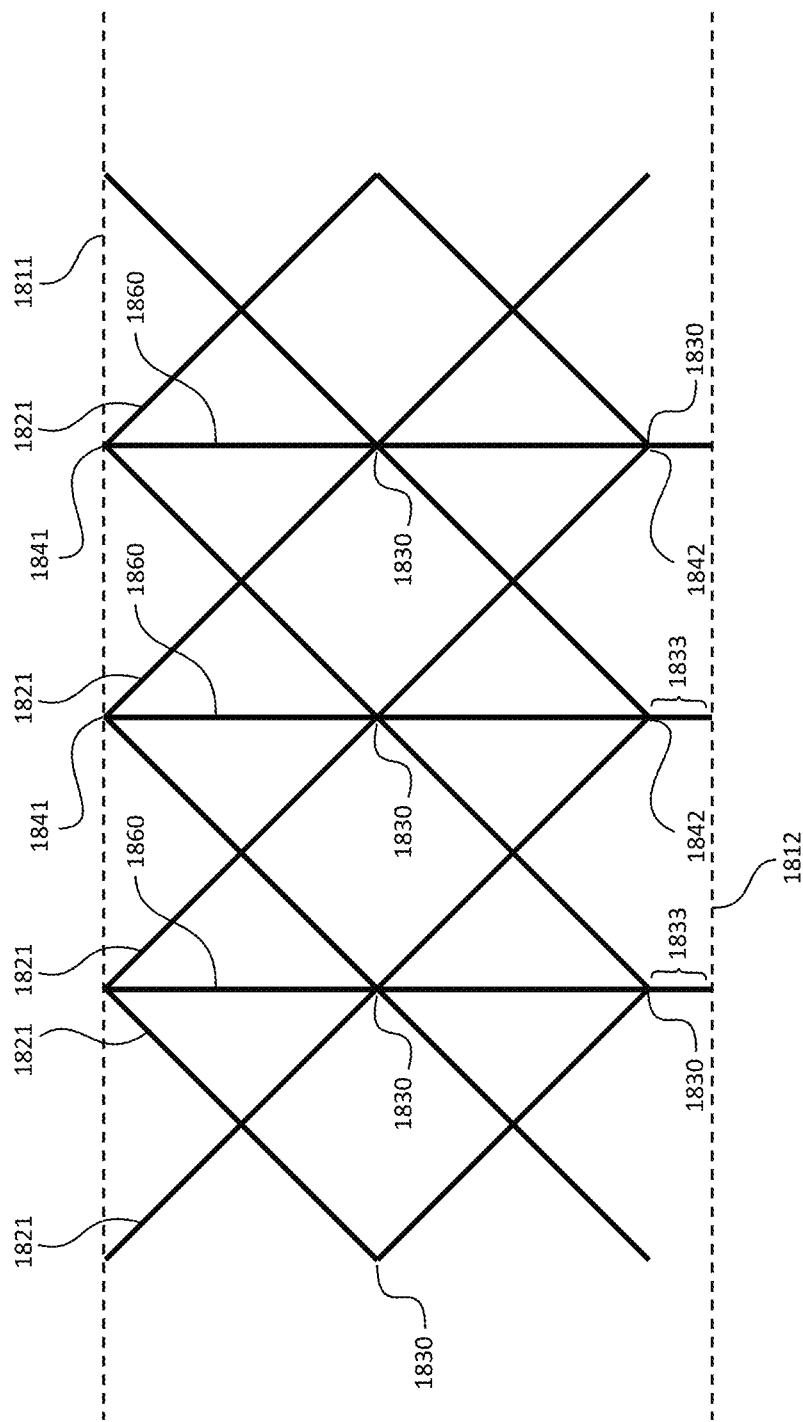
FIG. 18 is a schematic cross-sectional drawing of an exemplary micro-truss structure according to an embodiment of the present invention.

Referring to FIG. 18, a first embodiment of the invention is an improved micro-truss architecture that includes a first surface 1811 and a second surface 1812 parallel to each other with a distance therebetween defining a thickness of the micro-truss architecture; a plurality of angled struts 1821 extending along a plurality of non-vertical directions and each having a first end 1841 on (or abutting) the first surface 1811 and a second end 1842; a plurality of nodes 1830 where the plurality of angled struts 1821 extending along the plurality of directions interpenetrate one another; the plurality of angled struts 1821 and the plurality of nodes 1830 defining a plurality of unit cells each having an upper node selected from the plurality of nodes 1830, a lower node selected from the plurality of nodes 1830, and a cell height, the cell height being the distance between the upper node and the lower node; the second end 1842 of each angled strut being on the lower node closest to the second surface yet at a distance away from the second surface, a vertical post 1860 in each of the plurality of unit cells and extending from the first surface 1811 in a normal direction having a first end on the first surface and a second end extending past the lower node closest to the second surface onto the second surface 1812. The thickness of the micro-truss architecture can be approximately one unit cell height (e.g., one unit cell height plus the length of the portion 1833 of the vertical post 1860 extending past (i.e., extending vertically past) the lower node onto the second surface), or it can be approximately several unit cell heights, e.g., slightly more than two unit cell heights as illustrated in FIG. 18. The vertical post can extend past the lower node that is the closest node to the second surface by about 3% to 10% of the unit cell height. Each of the plurality of the angled struts and the vertical posts can have a solid or hollow structure. The material used to manufacture the micro-truss architecture can be metal, such as magnesium, aluminum, titanium, chromium, iron, cobalt, nickel, copper, zinc or alloys thereof. It can also be polymeric material such as polycarbonate, aramid, high impact polystyrene, nylon, ultra-high molecular weight polyethylene, poly(p-xylylene) or combinations thereof. Here, in the context of an embodiment of the present invention, the angled strut refers to a straight-line strut that forms an angle with the first surface at the first end and is used to define a top portion of a first unit cell (e.g., the unit cell at the upper left side of FIG. 18) and a bottom portion of a second unit cell (e.g., the unit cell at the lower right side of FIG. 18).

Figure 7B:
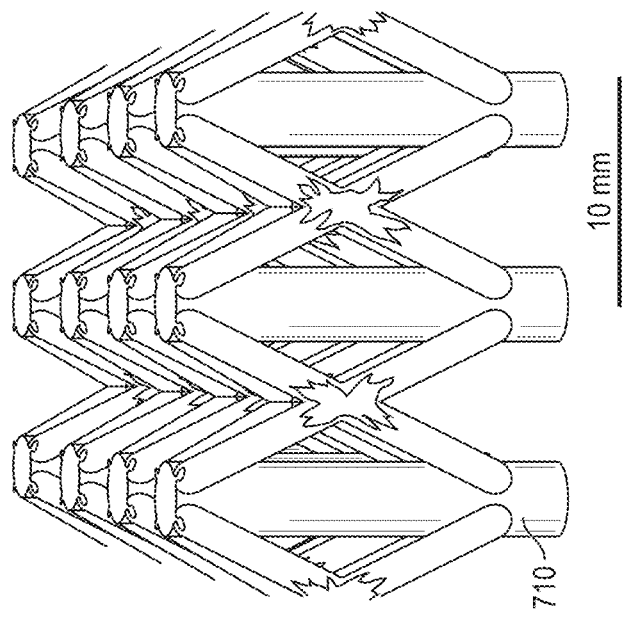
FIG. 7b is a side view photograph of a hollow nickel micro-truss with vertical posts that extend past the lower node, according to an embodiment of the present invention.
Figure 7A:
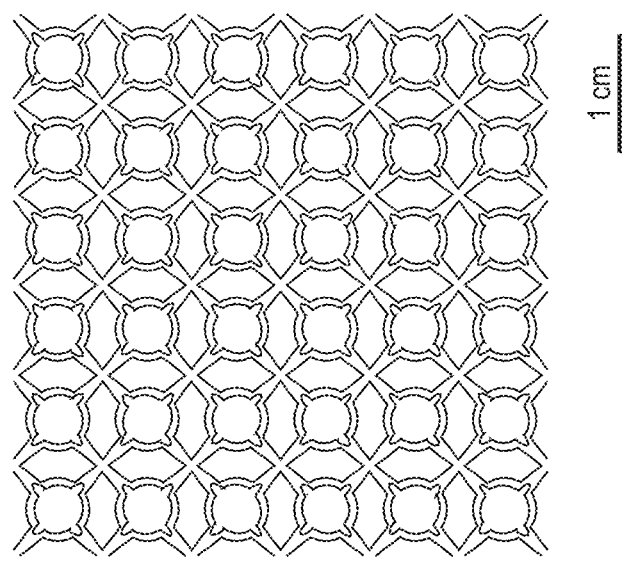
FIG. 7a is a perspective view photograph of a hollow nickel micro-truss with vertical posts that extend past the lower node, according to an embodiment of the present invention.
Figures 8A, 8B:
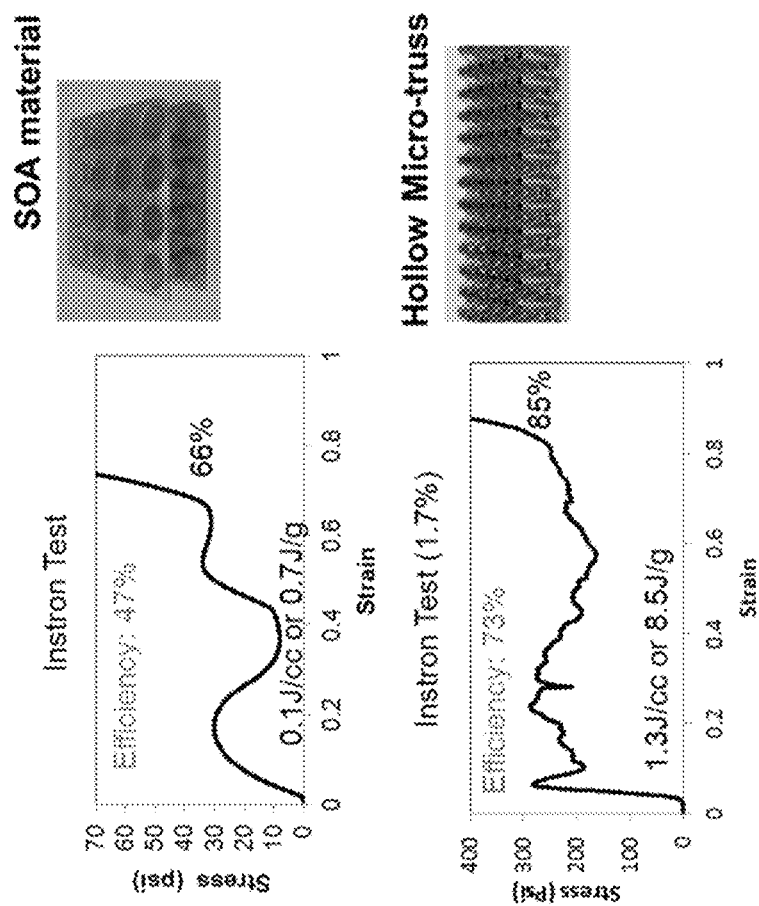
FIG. 8a is a photograph of, and quasi-static test results of, an embodiment of the micro-truss architecture shown in FIGS. 7a and 7b.
FIG. 8b is a photograph of, and quasi-static test results of, a commercial energy absorption material with a twin hemisphere structure.

In one embodiment of the invention, the plurality of angled struts each have a diameter of 0.7-1.5 mm, and the vertical post has a diameter of 2.5-4 mm. The thickness of the micro-truss architecture can be 15-25 mm. In one exemplary embodiment of the invention as shown in FIG. 7a and FIG. 7b, a 18 mm tall micro-truss structure comprises one full unit cell and has angled struts with a diameter of 1 mm and vertical posts 710 with a diameter of 3 mm, with the vertical posts 710 extending about 3 mm beyond the lower node of the unit cell. The angled struts and the vertical posts 710 are made of nickel with a hollow structure. FIG. 8a shows the compressive stress-strain response of the sample shown in FIGS. 7a and 7b, and FIG. 8b shows the compressive stress-strain response of a commercial energy absorption material with a twin hemispheres structure. Both were measured by drop impact testing with a 5 kg hammer dropped from 100 cm according to ASTM test method C365.

Figure 8C:
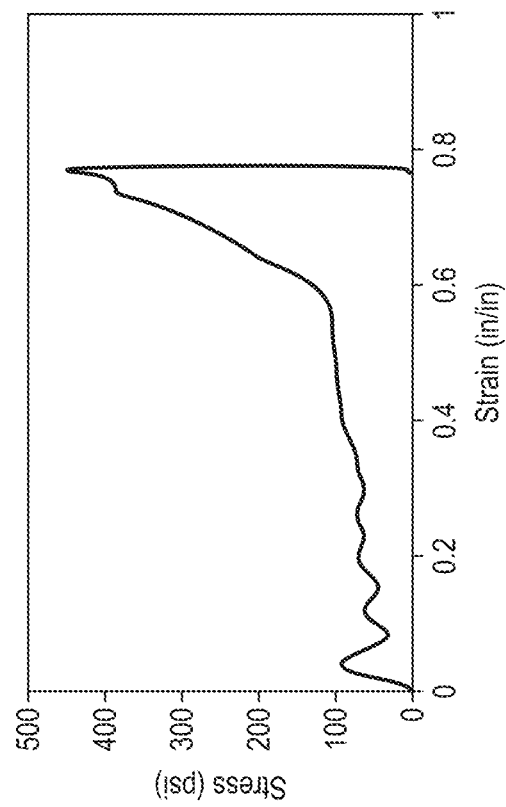
FIG. 8c shows an exemplary embodiment of two structures stacked according to an embodiment of the present invention, and the resulting stress-strain response.
Figure 8C:
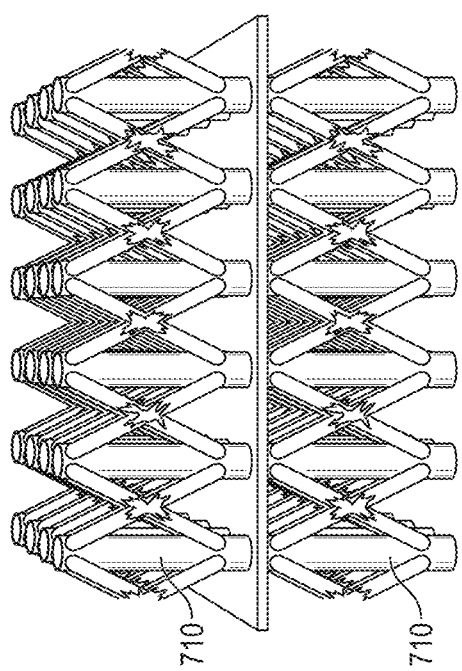

The performance of the micro-truss architecture of the first embodiment of the invention can be further improved by stacking multiple layers over one another. FIG. 8c illustrates such a structure with two of the micro-truss architectures shown in FIGS. 7a and 7b stacked up in the thickness direction. An interfacial sheet can be used at the interface of the two neighboring structures. The interfacial material can be metallic, ceramic, polymeric, or a composite material.

Second Embodiment of the Invention

In a second embodiment of the invention, an improved micro-truss architecture has a similar structure to that of the first embodiment of the invention, except that the vertical post does not extend beyond the lower node that is the closest node to the second surface. Instead, the struts, of the plurality of angled struts, extend past the lower node that is the closest node to the second surface and onto the second surface. Such a micro-truss architecture includes a first surface and a second surface parallel to each other with a distance therebetween defining a thickness of the micro-truss architecture; a plurality of angled struts extending along a plurality of non-vertical directions and each having a first end on (or abutting) the first surface and a second end; a plurality of nodes where the plurality of angled struts extending along a plurality of directions interpenetrate one another; the plurality of angled struts and the plurality of nodes defining a plurality of unit cells each having an upper node, a lower node, and a cell height, the cell height being the distance between the upper node and the lower node; the second end of each angled strut extending past the lower node closest to the second surface onto the second surface; a vertical post extending from the first surface in a normal direction having a first end on the first surface and a second end on the lower node closest to the second surface yet at a distance away from the second surface, but not extending beyond the lower node closest to the second surface. The thickness of the micro-truss architecture can be approximately one unit cell height, or it can be approximately several unit cell heights. The angled struts can extend past the lower node that is the closest node to the second surface at about 3 to 50% of the unit cell height. In one embodiment of the invention, the angled struts extend past the lower node that is the closest node to the second surface at about 50% of the unit cell height. Each of the plurality of the angled struts and the vertical posts can have a solid or hollow structure. The material used to manufacture the micro-truss architecture can be a metal, such as magnesium, aluminum, titanium, chromium, iron, cobalt, nickel, copper, zinc or an alloy. It can also be polymeric material such as polycarbonate, aramid, high impact polystyrene, nylon, ultra-high molecular weight polyethylene, poly(p-xylylene), or a combination of such polymeric materials.

Figure 9A:
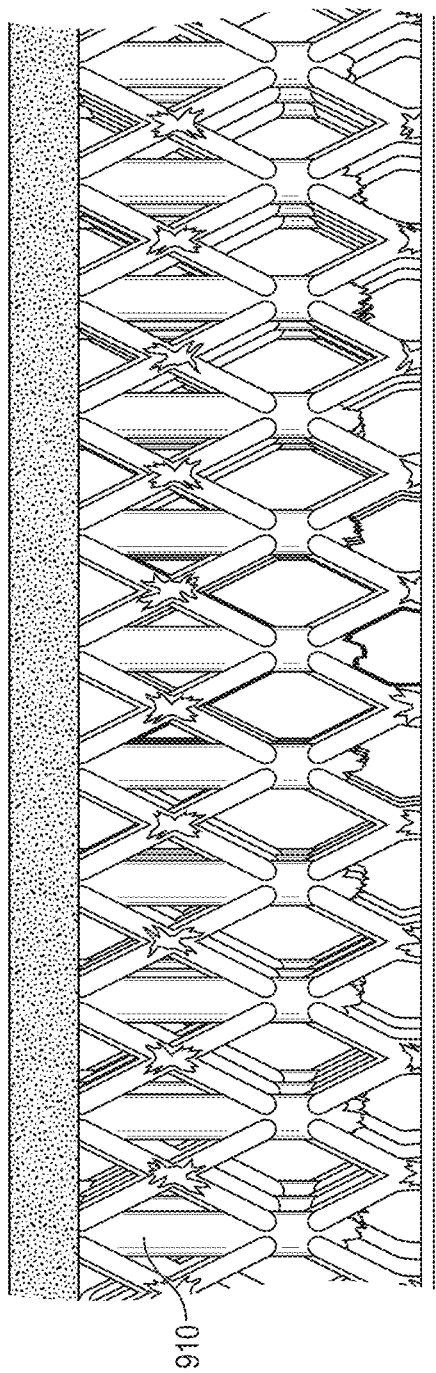
FIG. 9a is a side view photograph of an exemplary 1.5-cell tall hollow micro-truss with vertical posts extending only across 1 cell according to an embodiment of the present invention.
Figure 9B:
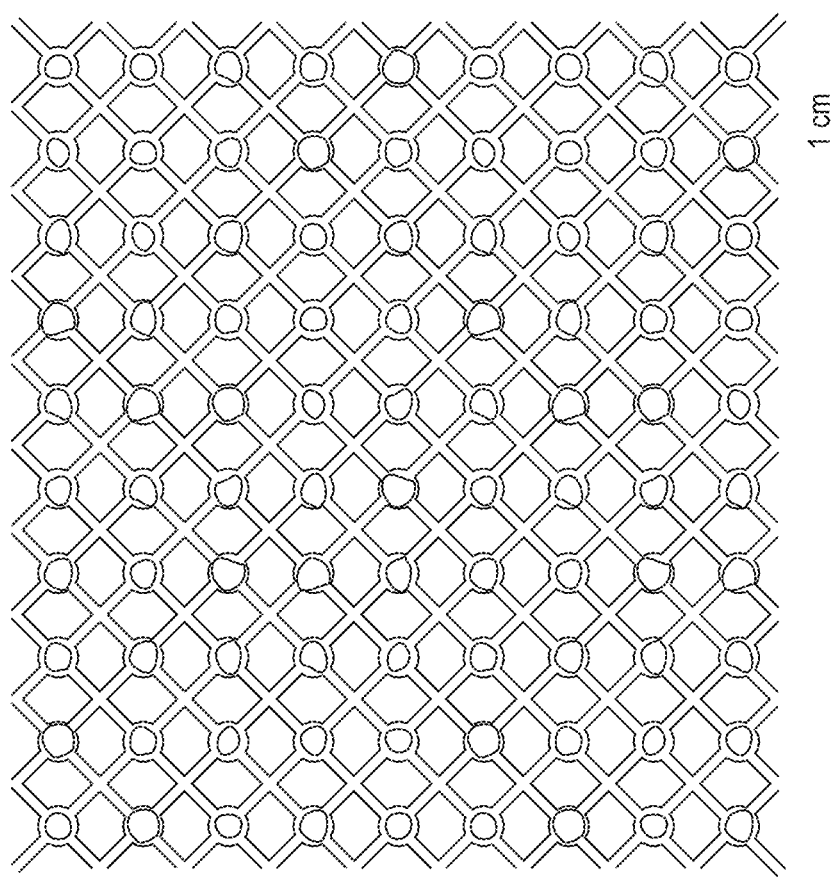
FIG. 9b is a top view photograph of an exemplary 1.5-cell tall hollow micro-truss with vertical posts extending only across 1 cell according to an embodiment of the present invention.
Figure 10:
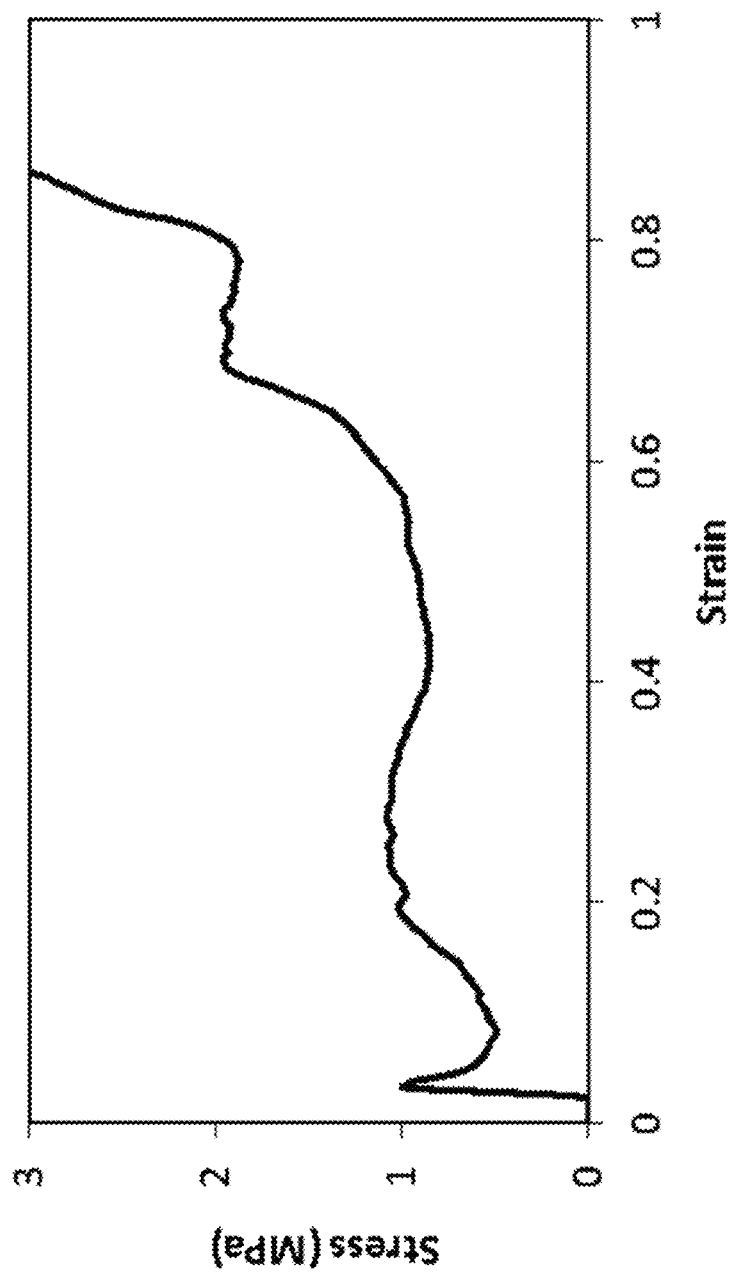
FIG. 10 shows the stress-strain curve measured in compression on the structure shown in FIGS. 9a and 9b.

An exemplary sample according the second embodiment of the invention is shown in FIG. 9a and FIG. 9b. The exemplary sample is a 1.5 cell tall hollow micro-truss structure with vertical posts 910 extending only between the upper node on the first surface and the lower node, and angled struts extending beyond the lower node, by a half unit cell height, to the second surface. The first surface of the micro-truss structure is bonded to a first face sheet, and the second surface of the micro-truss structure is bonded to a second face sheet. The material of each face sheet can be selected from polymeric, metallic, ceramic or composite materials. In the sample shown in FIG. 9a and FIG. 9b, the first face sheet material is a flexible polymer material, and the second face sheet material is steel. FIG. 10 shows the compressive stress-strain response of the sample shown in FIG. 9a and FIG. 9b. This sample displays multiple stress peaks ranging from about 1 MPa to about 2 MPa, and a densification strain of over 80%.

Third Embodiment of the Invention

Figure 11A:
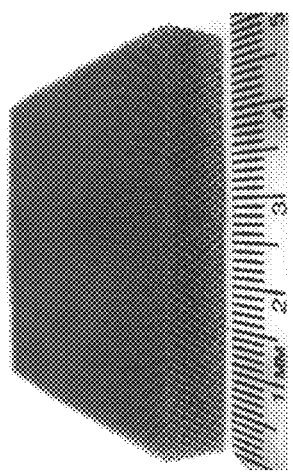
FIG. 11a is a perspective view photograph of an exemplary standard electroless nickel octahedral hollow micro-truss about 5 unit cells tall according to an embodiment of the present invention.
Figure 11C:
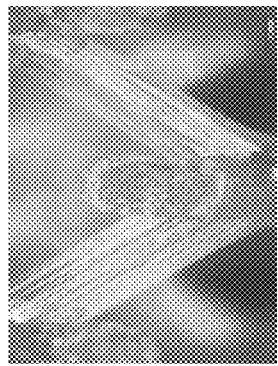
FIG. 11c is a close-up perspective view photograph pictures of the poly(p-xylylene) polymer octahedral hollow micro-truss of FIG. 11b.
Figure 11B:
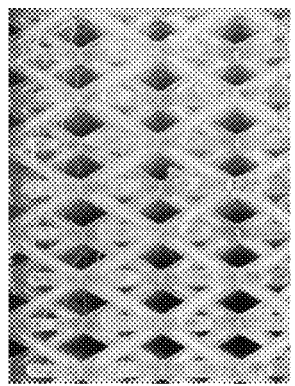
FIG. 11b is a perspective view photograph of an exemplary standard poly(p-xylylene) polymer octahedral hollow micro-truss about 5 unit cells tall according to an embodiment of the present invention.

A third embodiment of the invention employs a micro-truss structure which has at least four unit cells in the thickness direction. The more unit cells are stacked through the thickness direction, the more the initial stress peak and subsequent softening is evened out. FIGS. 11a, 11b, and 11c show two exemplary samples made according to the third embodiment of the invention. The sample shown in FIG. 11a is an octahedral hollow micro-truss structure that is about five unit cells tall, made using electroless nickel, and the sample shown in FIGS. 11b and 11c is an octahedral hollow micro-truss structure that is about five unit cells tall, made using poly(p-xylylene) polymer. In the embodiment of FIGS. 11b and 11c the propagation distances and the size of the nodes of the interpenetrating waveguides (or struts) are unperturbed by the change in the index of refraction caused by polymerization, due to the method of formation of the ordered 3D micro-truss structures (or the open-cell polymer micro-truss structures) used as templates for forming the hollow micro-truss structures.

Figure 12:
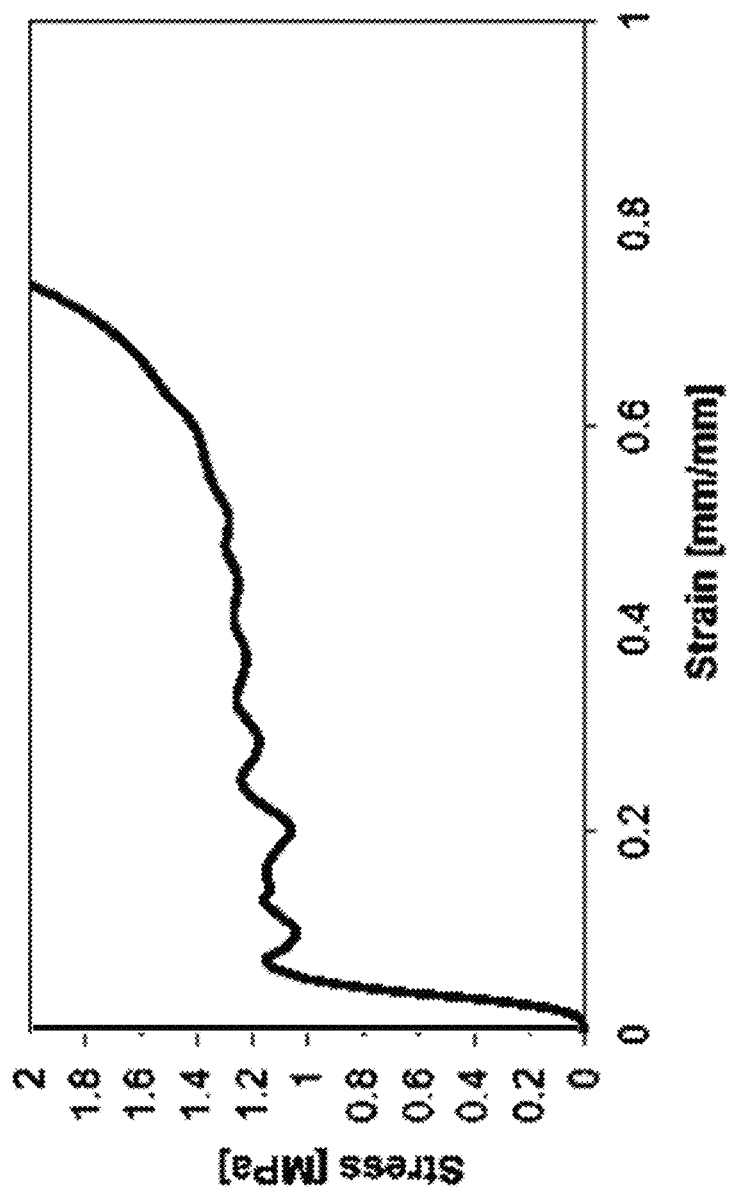
FIG. 12 shows the stress-strain curve measured in compression on the poly(p-xylylene) structure shown in FIGS. 11b and 11c.

FIG. 12 displays the compressive stress-strain response of the poly(p-xylylene) sample. It can be observed that this sample displays a response similar to the ideal response shown in FIG. 1, with a densification strain close to 60%, and an energy absorption efficiency of over 50%.

Fourth Embodiment of the Invention

A fourth embodiment of the current invention utilizes micro-truss architectures with interlocking structures. FIG. 13a shows an exemplary micro-truss architecture with interlocking structures. The repeating periodic interlocking unit cell structure has a first face 1311 and a second face 1312 parallel to each other and defining a height of the repeating periodic unit cell. In between the first face 1311 and second face 1312, there is a first unit cell structure 1371 having a first unit cell height; a second unit cell structure 1372 having a second unit cell height; and a plurality of vertical posts 1373 having a third height. The first unit cell structure 1371, the second unit cell structure 1372 and the plurality of vertical posts 1373 are interlocked within the first unit cell structure 1371, and the first unit cell height is the same as the height of the repeating periodic unit cell and being greater than each of the second unit cell height and the third height. In particular, the repeating periodic interlocking unit cell structure in FIG. 13a includes an octahedral cell interlocked with a tetrahedral cell and four vertical posts. Both the tetrahedral cell and the vertical posts are connected to the octahedral cell only at the first face 1311 (i.e., the top surface of the micro-truss architecture). Both the tetrahedral cell and the vertical posts terminate above the second face 1312 (i.e., the bottom surface of the micro-truss of the micro-truss architecture). FIG. 13b displays the simulated compressive stress-strain response of the structure shown in FIG. 13a. The simulated response displays a more plateau-like stress-strain response with an energy absorption efficiency of over 43%.

Figure 14B:
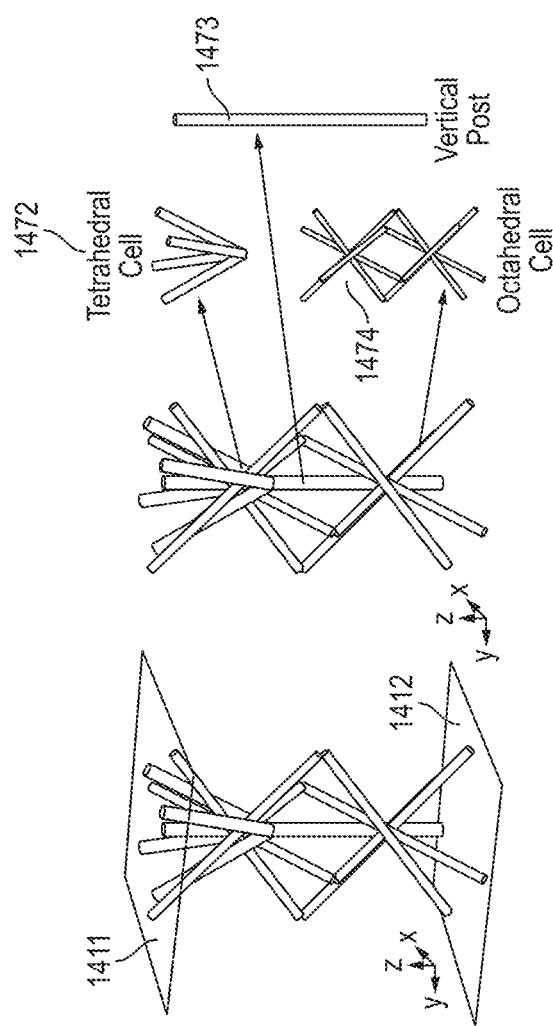
Figure 14A:
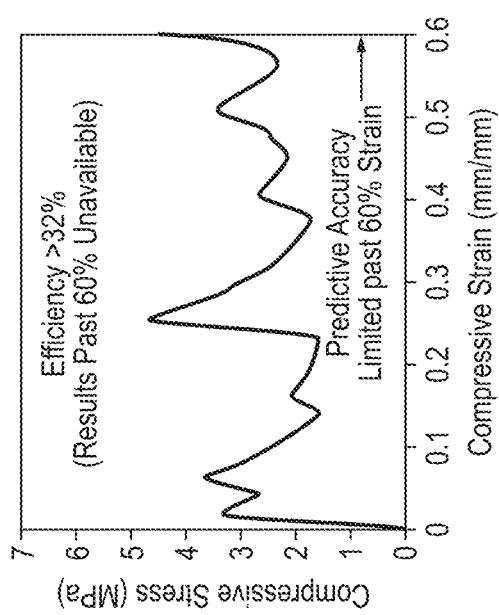
FIG. 14a shows an assembled view and an exploded view of a micro-truss architecture with interlocked unit cell structures according to an embodiment of the present invention.

FIG. 14a shows another exemplary sample according to the fourth embodiment of the invention. A repeating periodic unit cell structure has a first face 1411 and a second face 1412 parallel to each other and defining a height of the repeating periodic unit cell. In between the first face 1411 and second face 1412, there are two of a first unit cell structure 1471 stacked over each other, each having a first unit cell height about half of the height of the repeating periodic unit cell; a second unit cell structure 1472 having a second unit cell height about half of the height of the repeating periodic unit cell; and a vertical post 1473 having a third height less than the height of the repeating periodic unit cell. The first unit cell structure and the second unit cell structure are both connected to the vertical post. In particular, the repeating periodic interlocking unit cell structure in FIG. 14a includes an octahedral cell interlocked with a tetrahedral cell and a vertical post, similar to the exemplary sample shown in FIG. 13a, the difference being that the octahedral cell and the tetrahedral cell are connected along the vertical post. The simulated compressive stress-strain response of this sample is shown in FIG. 14b with an energy absorption efficiency of over 32%.

The energy absorption efficiency and densification strain of this embodiment of the invention can be further improved through optimization of the interlocking member geometric parameters. Such architectures can be created by using multiple exposures during the manufacturing process using photo-monomers.

Fifth Embodiment of the Invention

Figure 19B:
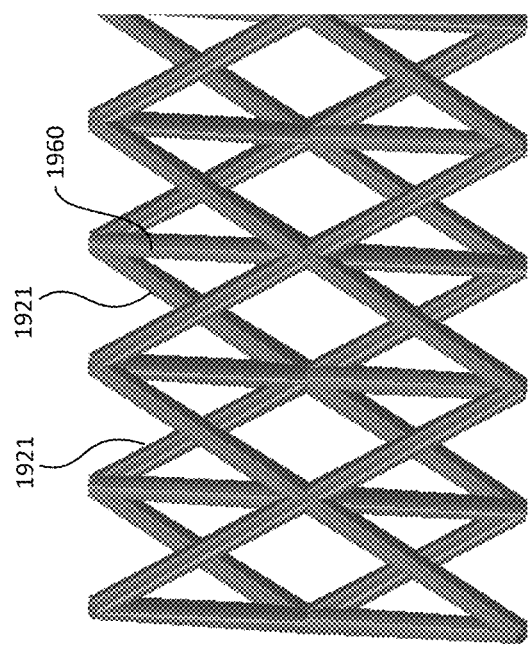
FIG. 19b is a side view illustration of a micro-truss structure with all nodes in an upper layer shifted according to an embodiment of the present invention.
Figure 19A:
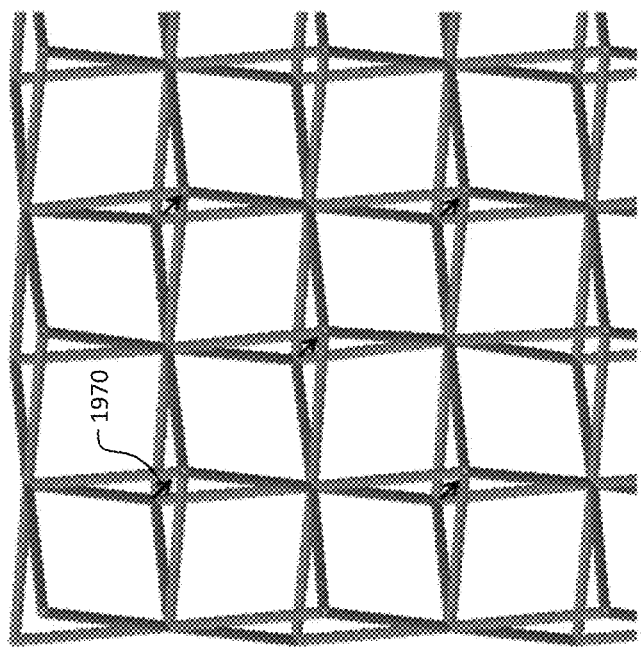
FIG. 19a is a top view illustration of a micro-truss structure with all nodes in an upper layer shifted by 0.1 L in same directions according to an embodiment of the present invention.
Figure 20B:
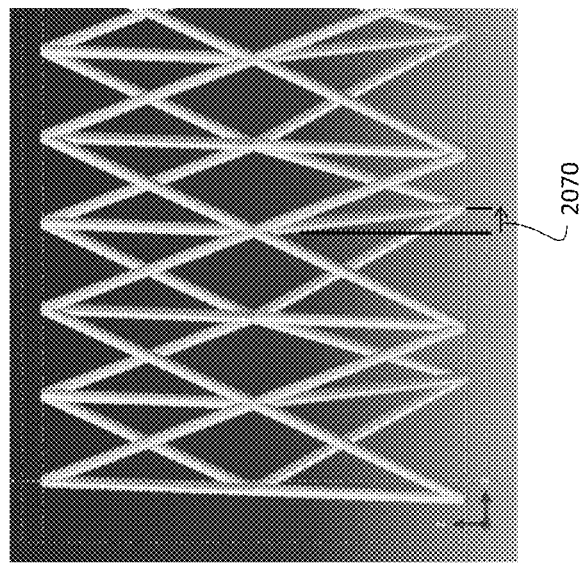
FIG. 20b is a side view illustration of a micro-truss structure with nodes in a bottom layer shifted according to an embodiment of the present invention.
Figure 20A:
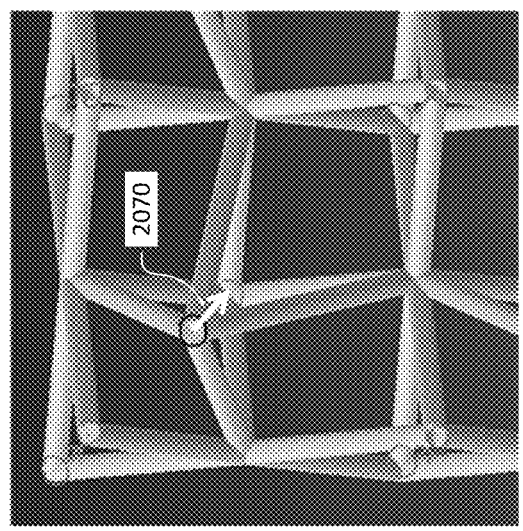
FIG. 20a is a top view illustration of a micro-truss structure with nodes in a bottom layer shifted according to an embodiment of the present invention.
Figure 21B:
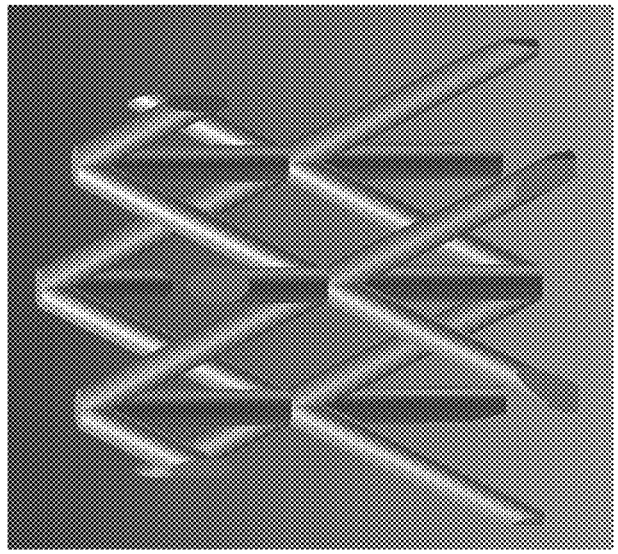
FIG. 21b is perspective view of a micro-truss structure with three-fold symmetry where all nodes in one plane sit in the center between the nodes in the planes above and below, according to an embodiment of the present invention.
Figure 21A:
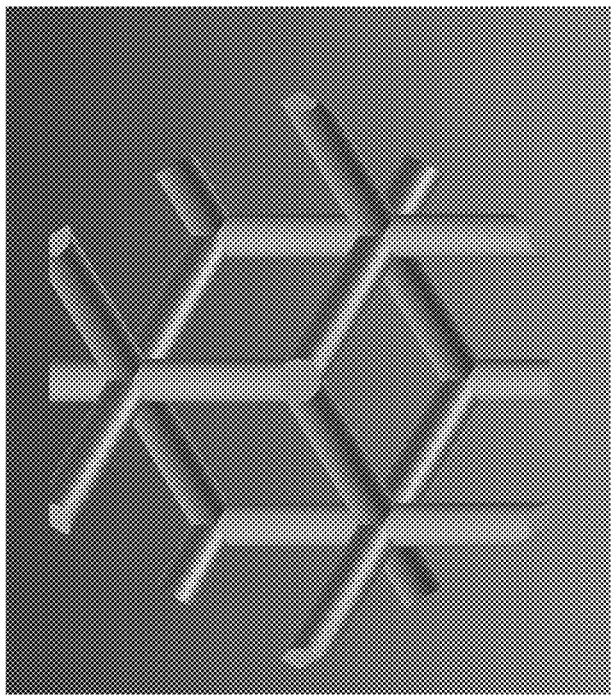
FIG. 21a is top view of a micro-truss structure with three-fold symmetry where all nodes in one plane sit in the center between the nodes in the planes above and below, according to an embodiment of the present invention.
Figure 22:
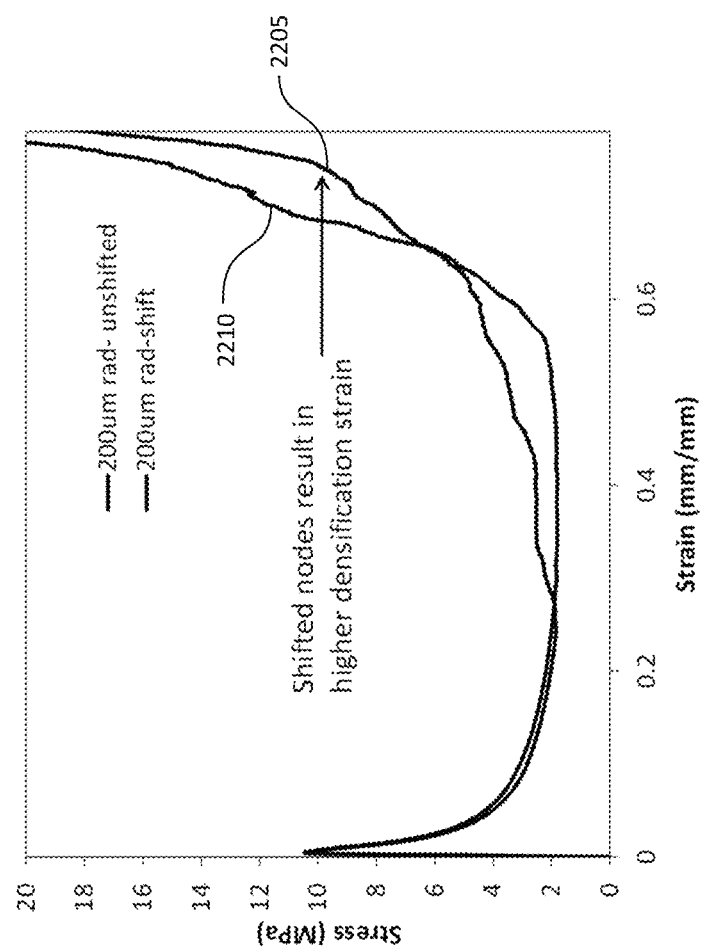
FIG. 22 shows the simulated stress-strain response of the micro-truss structure shown in FIG. 19a and FIG. 19b.

The fifth embodiment of the invention utilizes micro-truss architectures that have high densification strains. Such architectures can be achieved with a micro-truss structure that deforms on compression in such a way that the trusses of the structure do not pile up onto each other. FIG. 19a and FIG. 19b show one exemplary embodiment of such an architecture, which includes a plurality of angled struts 1921 and vertical posts 1960. There are multiple layers of nodes in the architecture. Except for the top layer, the nodes in each additional layer are shifted uniformly by a shift 1970 of about 0.01-0.5 times the length of each strut in between two adjacent nodes. FIGS. 20a and 20b show another exemplary embodiment of such an architecture. The nodes in each additional layer are alternately shifted in one of two directions, by a shift 2070, in such a way that the shift of each node is in the opposite direction to the shift of its four nearest neighbor nodes by an amount of 0.01-0.2 times the length of the strut in between two adjacent nodes. FIGS. 21a and 21b show yet another exemplary embodiment of such an architecture. The micro-truss structure has three-fold symmetry and all nodes in each plane lie in the center between the nodes in the adjacent planes when projected onto a plane parallel to the surface of the micro-truss. FIG. 22 displays the simulated compressive stress-strain response 2205 of the architecture shown in FIGS. 19a and 19b, together with the simulated compressive stress-strain response 2210 of an otherwise similar architecture in which the nodes are not shifted. It can be observed that structures according to this embodiment of the invention show a higher densification strain than a micro-truss with similar structure without the shifting in the locations of the nodes.

Figure 15B:
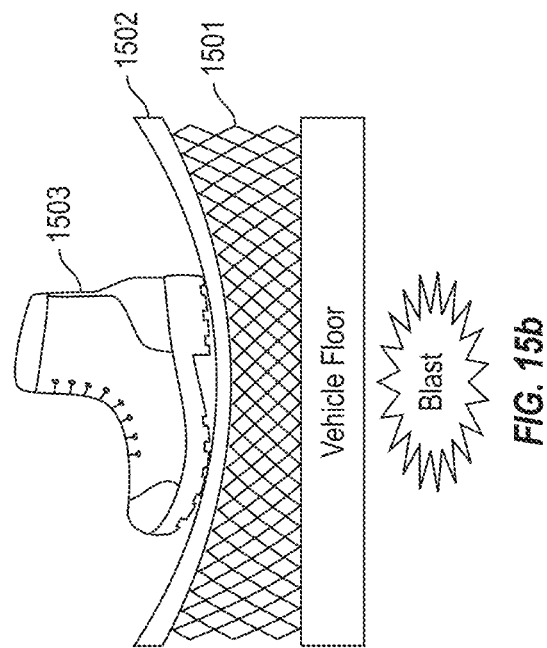
FIG. 15b shows a micro-truss based energy absorber combined with a flexible face sheet during a blast event.
Figure 15A:
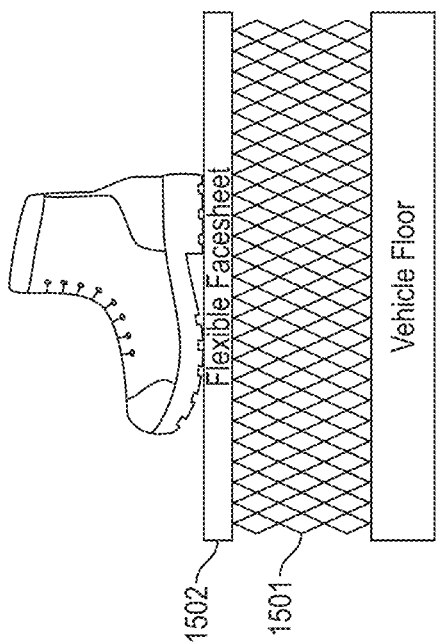
FIG. 15a shows a micro-truss based energy absorber combined with a flexible face sheet before a blast event.

The micro-truss architecture discussed in each embodiment of the invention can further include a face sheet on the first surface or the second surface, or both. The face sheet material can be selected for each surface from metallic, ceramic, polymeric or composite materials. In applications including floor mats and foot pads, a flexible face sheet material that does not concentrate the load being transmitted through the micro-truss structure onto the person or object being protected, but is able to wrap around and cushion the person or object, can be used. The flexible face sheet material can be selected from polymers including elastomers such as polymer foams, rubbers, and microcellular elastomeric polyurethanes which are also energy absorbing materials that can aid in impulsive load mitigation. FIGS. 15a and 15b show an exemplary floor mat or foot pad with a flexible face sheet 1502 over the micro-truss 1501. During a blast, the face sheet 1502 wraps around the foot 1503 to protect and cushion the person. The face sheet can be an integral part of the micro-truss based energy absorption system to protect the micro-truss structure from being deformed and absorb vibration during regular operation and use, such as foot traffic. It can also aid in shock absorption and bend to transmit only the maximum allowable load to the foot in the event of a blast.

Figure 16:
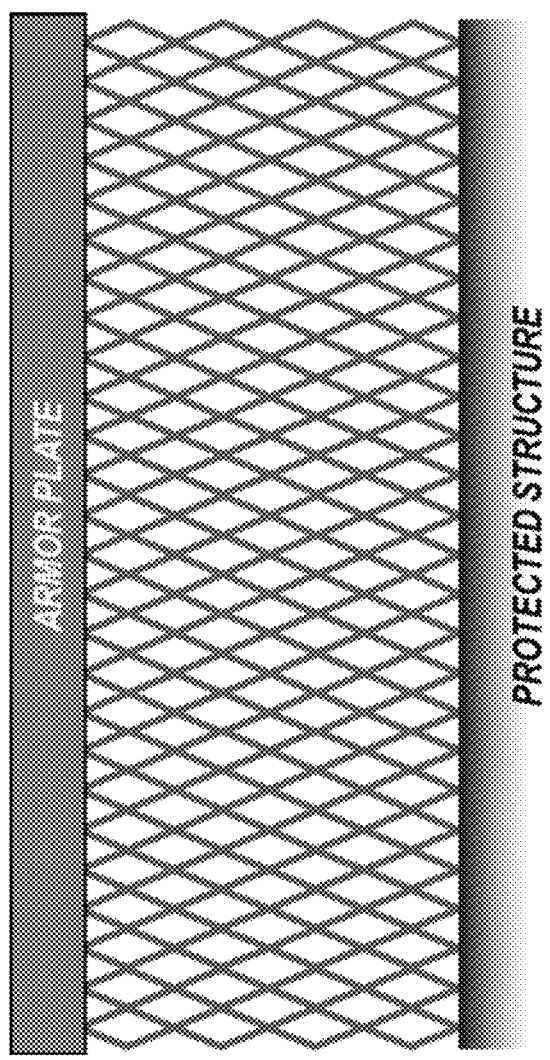
FIG. 16 shows a micro-truss based energy absorber combined with an armor plate according to an embodiment of the present invention.

The micro-truss architecture can also be combined with an armor plate, as shown in FIG. 16, for applications including vehicle underbody or side panels. The armor plate is for stopping ballistic threats, bullets, fragments and other penetrating objects and can be made of armor steel (RHA steel), or a ceramic material.

Figure 17:
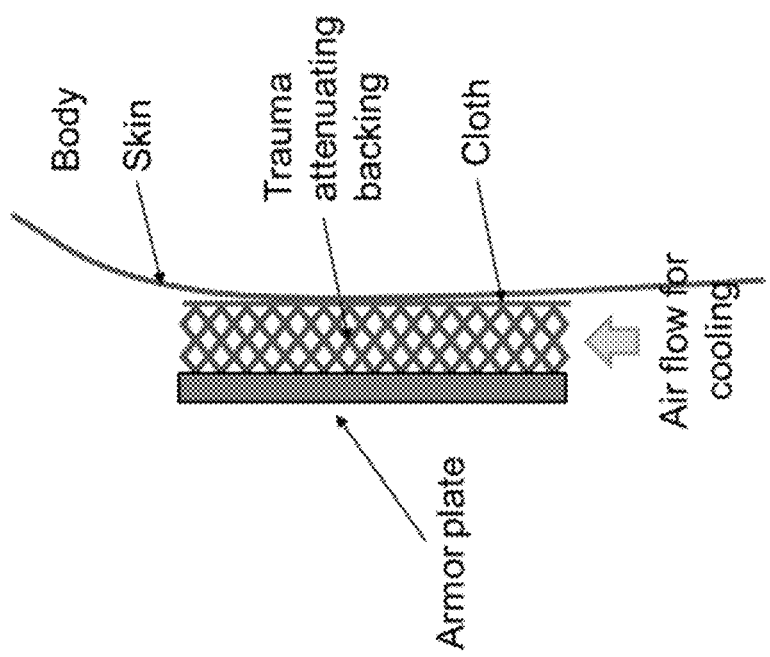
FIG. 17 is a schematic drawing of micro-truss based body armor that incorporates air flow cooling through the open-celled structure according to an embodiment of the present invention.

The various micro-truss architectures disclosed above can have open cellular structures. Such a structure can also be used for thermal management by passing a fluid through pores in the structure, i.e., spaces between the truss members, or through the truss members if the truss members are hollow tubes. This approach can be used to transport heat for vehicles, helmets, or body armor applications, as shown in FIG. 17.

Figure 23:
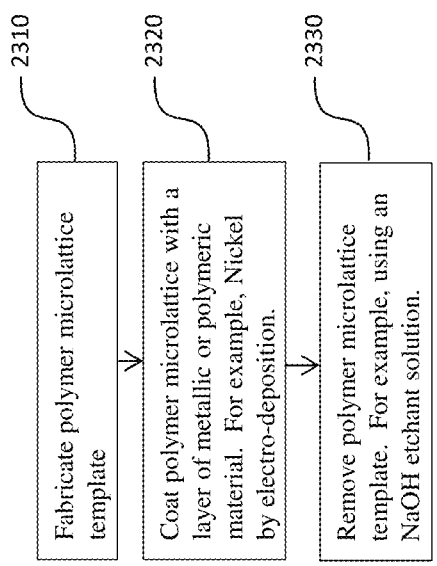
FIG. 23 is a flow chart describing an exemplary method to fabricate the micro-truss structure according to an embodiment of the present invention.

The various micro-truss architectures disclosed above can be fabricated using a polymer micro-truss template. FIG. 23 shows a flow chart describing an exemplary method to fabricate the various micro-truss architectures. After fabricating a polymer micro-truss template in an act 2310, the next step is to coat, in an act 2320, the polymer micro-truss with a coating layer of a desired micro-truss material such as a metallic or polymeric material. The coating method can be any suitable method for the desired material. The thickness of the coating can be adjusted to keep the transmitted stress less than a specified maximum stress, e.g., an injury threshold stress. Exemplary coating thicknesses may be in the range from about 10 µm to about 100 µm. For example, nickel can be deposited using an electro-deposition method at a desired thickness. Then, in a act 2330, the polymer micro-truss template can be removed, e.g., etched out from under the coating, leaving only the coating to form the final micro-truss architecture. The polymer micro-truss template can be removed with any suitable method, such as etching with NaOH solution.

In one embodiment, the formation of the polymer micro-truss template is accomplished, in act 2310, as follows. A suitable photopolymerizable resin is poured into a tray and covered with a mask having an array of holes. The tray is irradiated, through the mask, with collimated light incident on the mask from different directions. The collimated light entering the mask from a given direction through a given hole in the mask takes the shape of a beam of light in the resin, causing one or more chemical changes in the resin within the beam. These chemical changes affect the index of refraction, and as a result the beam causes a waveguide to form in the resin, which then in turn guides the beam along the path where the waveguide has already formed. In particular, in one embodiment of the present invention, the collimated light causes the resin to polymerize, resulting in a micro-truss structure. The unreacted resin is washed away, leaving the micro-truss template. When the illumination with collimated light incident on the mask from different directions is performed simultaneously, the propagation distances and the size of the nodes of the interpenetrating waveguides (or struts) are unperturbed by the change in the index of refraction caused by polymerization, due to the method of formation of the ordered 3D micro-truss structure (or the open-cell polymer micro-truss structure).

Embodiments of the present invention can be used to provide impact and blast protection with improved performance by reducing the impulsive load to a level below a damage threshold. In an impact or blast event these materials absorb a maximum of energy while not transmitting a stress in excess of an acceptable maximum stress, e.g., an injury threshold stress. Embodiments of the present invention are capable of a large volume decrease (indicated by the densification strain) while transmitting nearly constant pressure under dynamic loading at 1-20 m/s impact velocity.

Embodiments of the present invention can be used in systems where low or high velocity impact absorption, peak transmitted stress reduction or shock attenuation is desired, such as in blast protection systems, or in systems where mechanical energy or momentum must be reduced safely to protect a vehicle or its occupants, such as vehicle crash protection, personnel protective gear, safe velocity reduction for runaway vehicles, etc. Exemplary systems include foot pads and floor mats for the interior of vehicles that are susceptible to underbody mine or improvised explosive device (IED) explosions, underbody vehicle panels, helmet pads, trauma attenuating backings for body armor, lightweight, high performance blast protection for rotorcraft and vehicles, pedestrian impact structures for exterior vehicle components such as the hood, bumper or A-pillar, and impact structures for vehicle interior components such as dashboards, steering wheels, or vehicle pillars. Additional exemplary uses include lightweight packaging, covering containers, or other protective structures for fragile cargo; thin energy absorbing barriers for personnel in hazardous circumstances such as explosives handling or bomb disposal; barriers between or around fragile or sensitive vehicle components such as fuel tanks, battery packs, or engines, to isolate such structures from damage during assembly, repair, or crash; and formable energy absorbing personal protective materials where the material must be flexible or conformable around an arbitrary body or vehicle part or possibly a living being. These may be add-ons to armored vehicles or body armor.

Advantages of embodiments of the present invention include: absorbing more energy with lower weight and lower thickness than prior art honeycombs, metallic foams, and other cellular materials, leading to more energy absorbed per unit mass and volume while not exceeding the injury threshold stress; and accurate and easy adjustment to keep the maximum stress below the injury threshold stress by using wall thicknesses in a range from 20 to 1000 microns. Such structures may have crushing strengths in the range of approximately 0.5-1.5 MPa, which bodes well for applications in contact with humans, or up to ~7 MPa which bodes well for applications in vehicles close to humans. Hollow thin-walled metal structures according to embodiments of the present invention have the inherent advantage over polymer based cellular materials that many metals have a specific strength 10 times higher than that of polymers, enabling higher energy absorption per unit mass and higher volume decrease, which results in higher energy absorption per unit volume. Hollow thin-walled metal structures according to embodiments of the present invention further have no initial stress peaks, softening or fast densification; and offer opportunities for multifunctional applications. Processes used in embodiments of the present invention may be net shape manufacturing processes, making possible, for example, the fabrication of curved panels and non-constant cross-sections without the need for machining after a part is first formed.

An energy absorbing truss structure in one or more embodiments of the present invention is an ordered three-dimensional micro-truss structure at the millimeter to centimeter scale (e.g., from 0.5 mm to 5 cm). However, in some embodiments, the size of an ordered three-dimensional structure may be of order a few micrometers.

Although limited embodiments of energy absorbing truss structures have been specifically described and illustrated herein, many modifications and variations will be apparent to those skilled in the art. Accordingly, it is to be understood that the truss structures constructed according to principles of this invention may be embodied other than as specifically described herein. The invention is also defined in the following claims and equivalents thereof.

What is claimed is:

1. A micro-truss architecture for protection from impulsive loads, the micro-truss architecture comprising:
   a repeating unit cell structure comprising:
      a plurality of nodes, a first group of the nodes being in a first layer, a second group of the nodes being in a second layer, the first and second layers being spaced from each other in a first direction normal to the first and second layers, each of the first and second layers being a plane extending in a second direction and a third direction, the second and third directions being perpendicular to each other; and
      a plurality of struts, each of the struts extending between one of the nodes in the first layer and one of the nodes in the second layer,
   wherein each of the nodes in the first layer are offset from each of the nodes in the second layer in the first direction and in at least one of the second and third directions, and
   wherein each of the nodes in the second layer is unequally spaced from at least two of its four nearest neighboring nodes in the second layer.

2. The micro-truss architecture of claim 1, wherein the nodes and struts comprise a material selected from the group consisting of magnesium, aluminum, titanium, chromium, iron, cobalt, nickel, copper, zinc, alloys thereof, polycarbonate, aramid, high impact polystyrene, nylon, ultra-high molecular weight polyethylene, poly(p-xylylene), and combinations thereof.

3. The micro-truss architecture of claim 1, wherein the micro-truss architecture is a part of a foot pad or floor mat inside a vehicle.

4. The micro-truss architecture of claim 1, wherein the shifted position of one of the nodes in the first layer is shifted away from a nominal position of a corresponding one of the nodes in the second layer in a direction opposite to the direction of shifts at its nearest neighboring nodes.

5. The micro-truss architecture of claim 1, wherein each of the struts extends between one of the nodes in the first layer and one of the nodes in the second layer in a direction non-parallel to the first direction.

6. The micro-truss architecture of claim 1, wherein the plurality of struts comprises a plurality of angled struts and a plurality of vertical posts.

7. The micro-truss architecture of claim 1, wherein the micro-truss architecture further comprises:
   a first surface;
   a second surface; and
   a face sheet on the first surface, wherein the face sheet is configured to protect the nodes and the struts from deformation during operation, aid in shock absorption, and wrap around a protected object in the event of a blast.

8. The micro-truss architecture of claim 7, wherein the face sheet comprises a sheet material selected from the group consisting of polymer foam, polymer, metal, and combinations thereof.

9. The micro-truss architecture of claim 8, wherein one of the nodes in the first layer is shifted away from a nominal position of a corresponding one of the nodes in the second layer by 0.01-0.5 times the length of the strut extending between two adjacent nodes.

* * * * *